United States Patent
Dudar

(10) Patent No.: US 10,746,112 B2
(45) Date of Patent: Aug. 18, 2020

(54) METHOD AND SYSTEM FOR NVH CONTROL

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 12 days.

(21) Appl. No.: 16/164,545

(22) Filed: Oct. 18, 2018

(65) Prior Publication Data

US 2020/0123987 A1    Apr. 23, 2020

(51) Int. Cl.

| F02D 41/00 | (2006.01) |
|---|---|
| F02D 41/26 | (2006.01) |
| F02D 17/02 | (2006.01) |
| F02D 17/04 | (2006.01) |
| G06K 9/00 | (2006.01) |

(52) U.S. Cl.
CPC ......... *F02D 41/0087* (2013.01); *F02D 17/02* (2013.01); *F02D 17/04* (2013.01); *F02D 41/008* (2013.01); *F02D 41/0082* (2013.01); *F02D 41/0085* (2013.01); *F02D 41/26* (2013.01); *G06K 9/00845* (2013.01); *G06K 9/00335* (2013.01)

(58) Field of Classification Search
CPC ........ F02D 17/02; F02D 41/26; F02D 41/008; F02D 41/0082; F02D 41/0085; F02D 41/0087; B60W 10/06; B60W 40/09; B60W 50/10; B60W 40/08; B60W 2540/30; B60W 2540/22; B60W 2040/0872; B60W 50/08; B60W 2040/0881; B60W 2420/42; B60K 2370/193; G06K 9/00335; G06K 9/00845; G06K 9/00791; G06K 9/78; G06K 9/00798; G06K 9/00825; G06K 9/00597; B60R 11/04
USPC ........................................................ 701/103
See application file for complete search history.

(56) References Cited

U.S. PATENT DOCUMENTS

| 4,683,856 A * | 8/1987 | Matsuura ................ B65B 51/30 123/406.24 |
|---|---|---|
| 5,270,575 A * | 12/1993 | Togai .................... H02J 7/1446 290/400 |
| 5,540,633 A | 7/1996 | Yamanaka et al. |
| 7,278,391 B1 * | 10/2007 | Wong ...................... F02D 17/02 123/192.1 |
| 7,577,511 B1 | 8/2009 | Tripathi et al. |

(Continued)

OTHER PUBLICATIONS

Meek, A., "This startup wants to monitor drivers with cameras to fix distracted driving," BGR Website, Available Online at https://bgr.com/2017/06/03/nauto-distracted-driving-profile, Jun. 3, 2017, 3 pages.

*Primary Examiner* — Sizo B Vilakazi
*Assistant Examiner* — Brian R Kirby
(74) *Attorney, Agent, or Firm* — Geoffrey Brumbaugh; McCoy Russell LLP

(57) ABSTRACT

Methods and systems are provided for reducing driver dissatisfaction from NVH associated with cylinder deactivation. Audio and video feed is captured from inside a vehicle and analyzed to infer if a vehicle operator is distracted. If yes, then a VDE transition is scheduled to occur during the time when the driver is distracted and unlikely to notice the NVH.

19 Claims, 7 Drawing Sheets

(56) References Cited

U.S. PATENT DOCUMENTS

| | | | | |
|---|---|---|---|---|
| 7,785,230 | B2* | 8/2010 | Gibson | B60W 30/20 |
| | | | | 477/101 |
| 7,836,866 | B2* | 11/2010 | Luken | F02D 17/02 |
| | | | | 123/481 |
| 8,108,132 | B2* | 1/2012 | Reinke | F02D 17/04 |
| | | | | 123/198 F |
| 8,108,832 | B2* | 1/2012 | Etelapera | G06F 8/65 |
| | | | | 717/107 |
| 8,209,103 | B2* | 6/2012 | Oyama | B60K 6/445 |
| | | | | 701/101 |
| 9,193,359 | B2 | 11/2015 | Hui et al. | |
| 9,460,601 | B2 | 10/2016 | Mimar | |
| 9,739,212 | B1* | 8/2017 | Srinivasan | F02D 41/0087 |
| 9,786,181 | B2* | 10/2017 | Jo | F02D 41/403 |
| 10,006,379 | B2 | 6/2018 | Rollinger et al. | |
| 10,037,471 | B2 | 7/2018 | Satzoda et al. | |
| 2003/0154009 | A1* | 8/2003 | Basir | G07C 5/085 |
| | | | | 701/32.2 |
| 2009/0133859 | A1* | 5/2009 | Suzuki | B60K 6/365 |
| | | | | 165/121 |
| 2013/0038437 | A1* | 2/2013 | Talati | B60K 35/00 |
| | | | | 340/438 |
| 2015/0038855 | A1* | 2/2015 | Berckmans | A61B 5/18 |
| | | | | 600/483 |
| 2015/0091740 | A1* | 4/2015 | Bai | G08B 21/06 |
| | | | | 340/901 |
| 2015/0375756 | A1* | 12/2015 | Do | B60W 30/08 |
| | | | | 701/1 |
| 2016/0082838 | A1* | 3/2016 | Melas | G06K 9/00845 |
| | | | | 340/575 |
| 2016/0101784 | A1* | 4/2016 | Olson | B60K 35/00 |
| | | | | 340/576 |
| 2016/0252023 | A1* | 9/2016 | Srinivasan | F02D 41/2422 |
| | | | | 701/115 |
| 2016/0267335 | A1* | 9/2016 | Hampiholi | G06F 3/013 |
| 2016/0347314 | A1* | 12/2016 | Kuwahara | B60W 30/182 |
| 2017/0159587 | A1* | 6/2017 | Glugla | F02D 29/02 |
| 2017/0370301 | A1* | 12/2017 | Srinivasan | F02D 41/0225 |
| 2018/0058346 | A1 | 3/2018 | Rollinger et al. | |
| 2018/0126901 | A1* | 5/2018 | Levkova | G06K 9/00597 |
| 2018/0230919 | A1* | 8/2018 | Nagashima | F02D 41/3058 |
| 2018/0335776 | A1* | 11/2018 | Theis | G05D 1/0088 |
| 2018/0364966 | A1* | 12/2018 | Valeri | G06F 3/167 |
| 2019/0184959 | A1* | 6/2019 | Cao | B60W 30/1882 |
| 2019/0213429 | A1* | 7/2019 | Sicconi | G06K 9/00845 |

\* cited by examiner

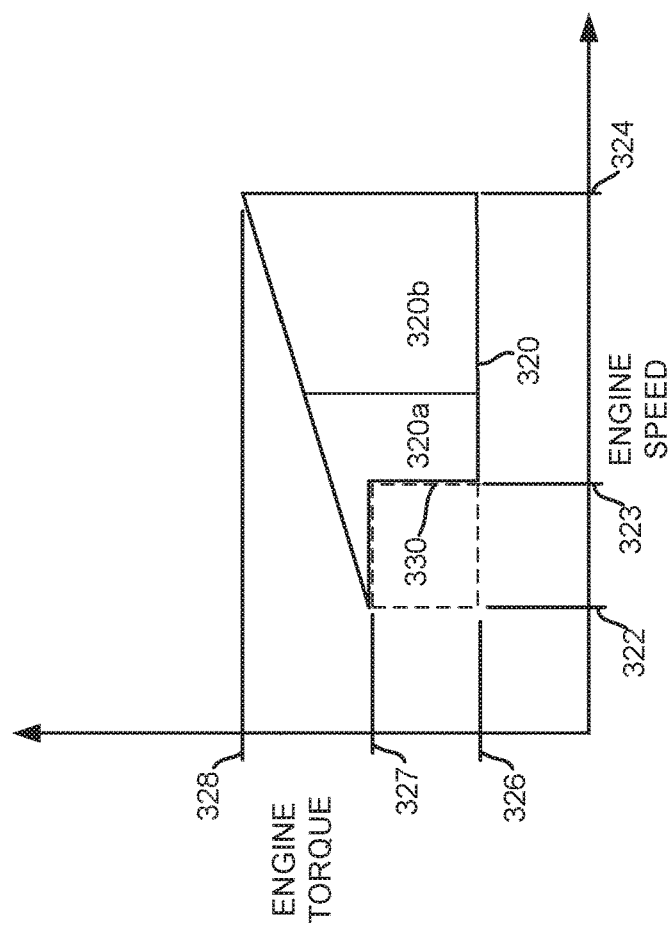
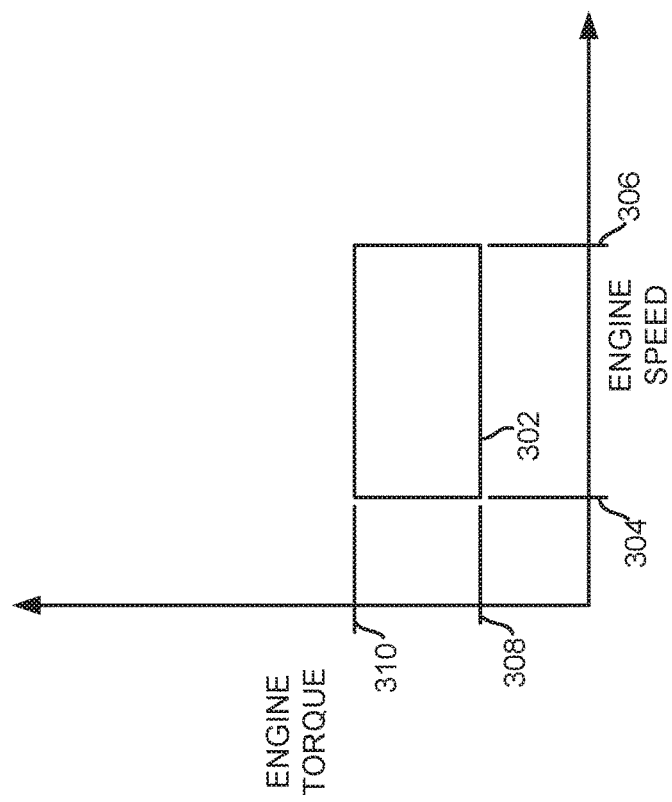

METHOD AND SYSTEM FOR NVH CONTROL

FIELD

The present description relates generally to methods and systems for controlling VDE transitions in a vehicle engine to reduce NVH induced customer dissatisfaction.

BACKGROUND/SUMMARY

Some engines, known as a variable displacement engines (VDE), may be configured to operate with a variable number of active and deactivated cylinders to increase fuel economy. Therein, a portion of the engine's cylinders may be disabled during selected conditions defined by parameters such as a speed/load window, as well as various other operating conditions including engine temperature. An engine control system may disable a selected group of cylinders, such as a bank of cylinders, through the control of a plurality of cylinder valve deactivators that affect the operation of the cylinder's intake and exhaust valves, through the control of a plurality of selectively deactivatable fuel injectors that affect cylinder fueling, and/or through the control of the ignition system to selectively control (e.g., withhold) spark to deactivatable cylinders. By deactivating engine cylinders at low speeds/light loads, associated pumping losses can be minimized, and engine efficiency is increased.

However, noise, vibration, and harshness (NVH) may be caused during engine transitions between a VDE state where one or more cylinders are deactivated, and a non-VDE state where all cylinders are active. Specifically, the engine's crankshaft and firing order are defined to reduce NVH when all cylinders are active. Engine torque production and engine speed may be smoothest (e.g., producing least variation from desired engine torque and desired engine speed) when the engine is operated with its full complement of cylinders. In the VDE state, engine torque variation and engine speed variation from desired values may increase because of longer intervals between combustion events. As a result, NVH from the engine during a VDE state, as observed by vehicle occupants, may increase. If the engine is operated with higher levels of noise and vibration, vehicle occupants may find riding in the vehicle objectionable. Thus, it may be difficult to provide higher levels of fuel efficiency without degrading the driving experience.

One example approach for reducing the VDE associated NVH is shown by Rollinger et al. in U.S. Pat. No. 10,006,379. Therein, a larger number of VDE states are enabled when an estimate of road roughness is elevated. Consequently, an engine can be operated in the VDE mode when the NVH associated with the VDE transition can be masked by road roughness and vehicle occupants are less likely to notice the NVH.

However the inventors herein have identified potential issues with such an approach. As one example, rough roads may be far and few in between. As a result, relying on road roughness may result in limited opportunities to enable VDE operation.

The inventors have recognized that there may be other conditions where a vehicle driver is distracted that can be leveraged for providing more opportunities for VDE operation. For example, during conditions when a driver is engaged in in-cabin conversation (or otherwise distracted), or when cabin speakers are operating at an elevated volume, the driver may not notice the NVH. Likewise, the NVH may not be perceived when ambient noise around the car is elevated.

Further still, if the vehicle operator is a transient driver, such as may occur due to car sharing, the driver may not be as concerned about the vehicle's NVH as long as the vehicle is performing the main task of transporting the driver to the desired location. The same may be true for a vehicle occupant if the vehicle is a driverless autonomous vehicle. During such conditions, cylinder deactivation does not need to be limited on account of driving experience being affected by NVH.

Thus in one example, NVH related to cylinder deactivation may be better balanced with fuel economy by a method comprising: initiating a transition between operating an engine with more cylinders active to operating with fewer cylinders active in response to one or more of audio and video feed captured at the vehicle.

As an example, various vehicle sensors may be used to capture in-vehicle as well as ambient vehicle noise. Likewise, vehicle cameras may be used to monitor occupant behavior. The audio and video feeds may be analyzed, for example using voice-recognition software to identify if the driver is engaged in conversation, and using image analysis (such as eye movement, hand movement, etc.) to identify if the driver is exhibiting distracted behavior. A vehicle controller may schedule a VDE transition (from a non-VDE mode to a VDE mode, or vice versa) to occur while the driver is talking or distracted, as inferred based on the audio and/or video feed captured inside (or outside) the vehicle. Furthermore, VDE may be controlled based on engine operating conditions, and with reduced constraints regarding driver dissatisfaction, during conditions when the vehicle is used for car sharing or when the vehicle is driven autonomously. Consequently, it may be possible to provide the technical result of operating an engine cylinder in a cylinder deactivation mode at a time when vehicle occupants are not likely to notice the additional engine noise and vibration.

The present description may provide several advantages. In particular, the approach may provide improved vehicle fuel economy by enabling cylinder deactivation to be applied over a larger portion of a drive cycle. In addition, the approach may reduce the possibility of disturbing occupants of a vehicle while cylinders are deactivated or while they are transitioned between active and deactivated states. Further, the approach may enable cylinder deactivation responsive to audio and video feed captured inside and outside the vehicle so that fuel economy may be increased while vehicle occupants are less susceptible to noise and vibration that may be related to deactivating engine cylinders.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where:

FIGS. 3A and 3B show examples of cylinder deactivation regions.

DETAILED DESCRIPTION

Figure 1:
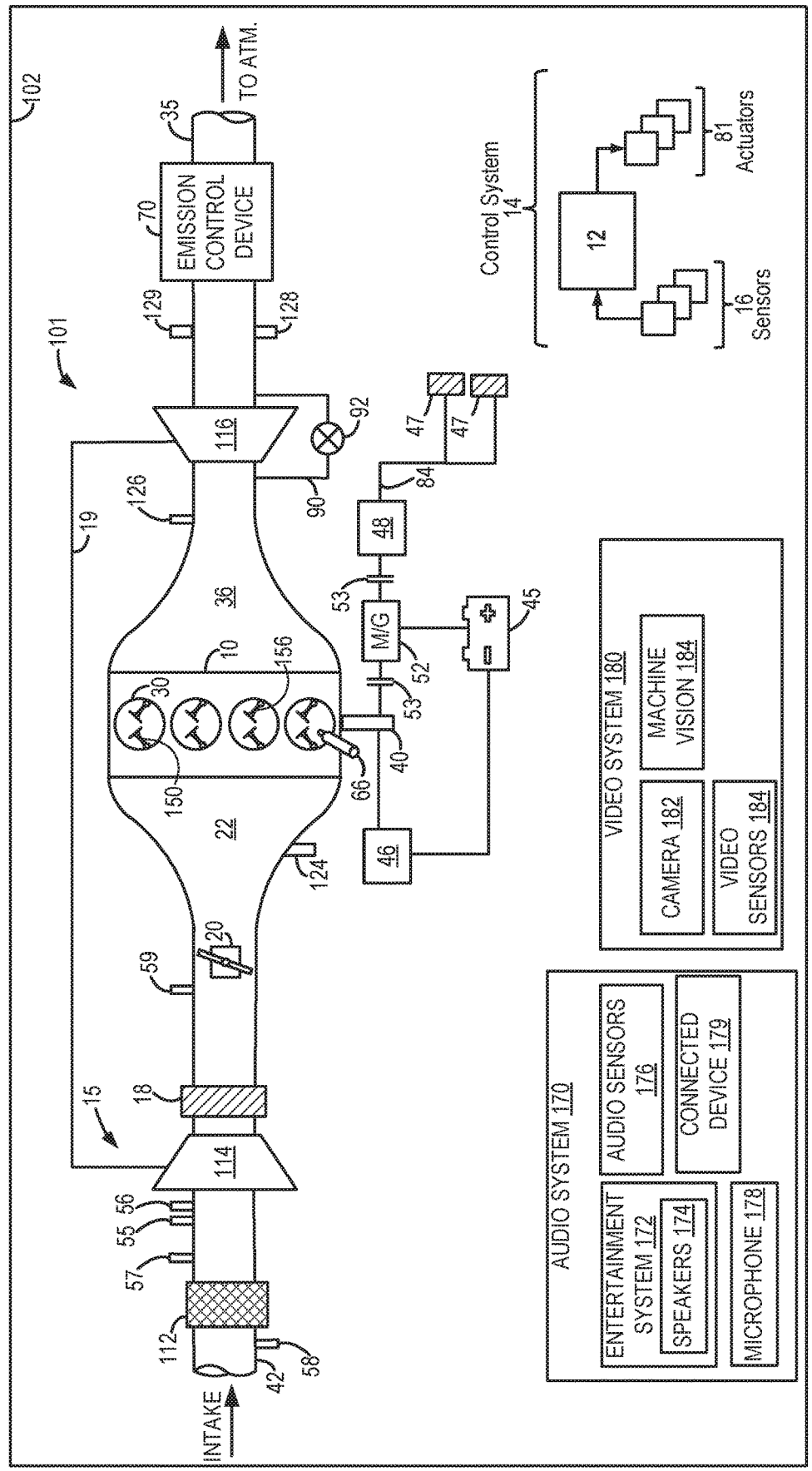
FIG. 1 is a schematic diagram of a vehicle system including a variable displacement engine.
Figure 5:
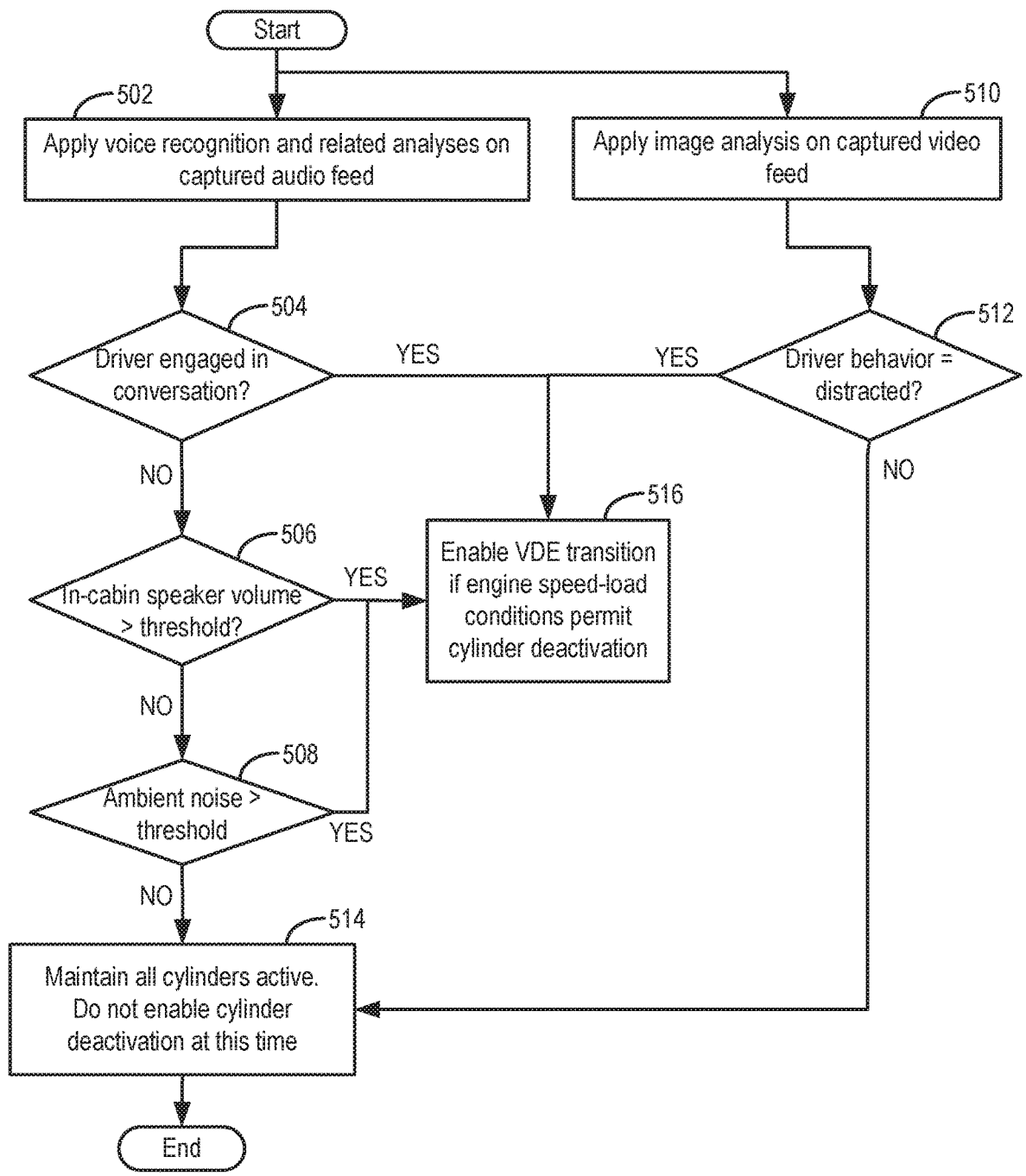
FIG. 5 shows a flow chart of an example method for capturing and analyzing vehicle audio and video feed to identify opportunities for cylinder deactivation.
Figure 6:
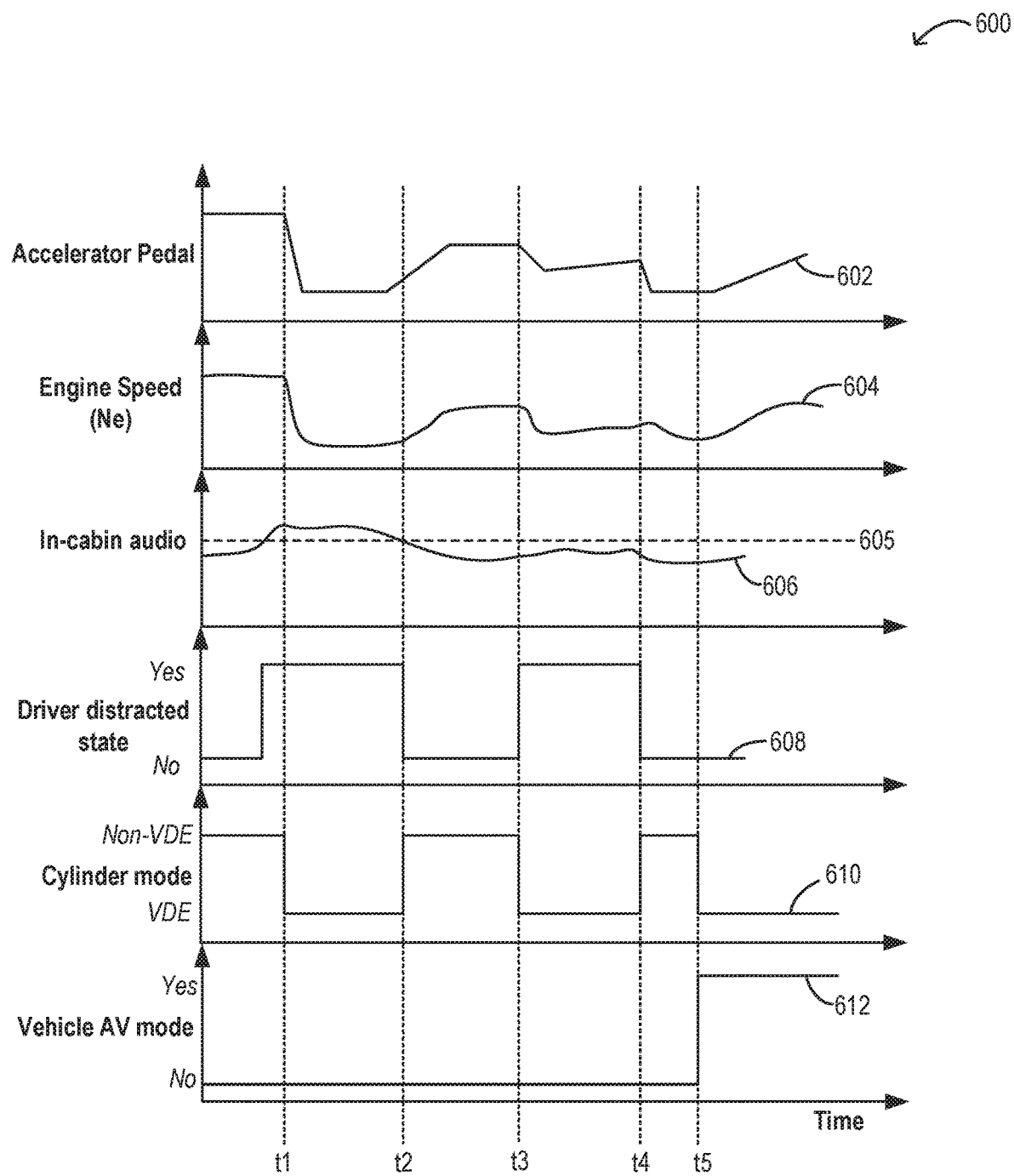
FIG. 6 shows a prophetic example of adjusting a number of operating engine cylinders based on driver distraction.
Figure 7:
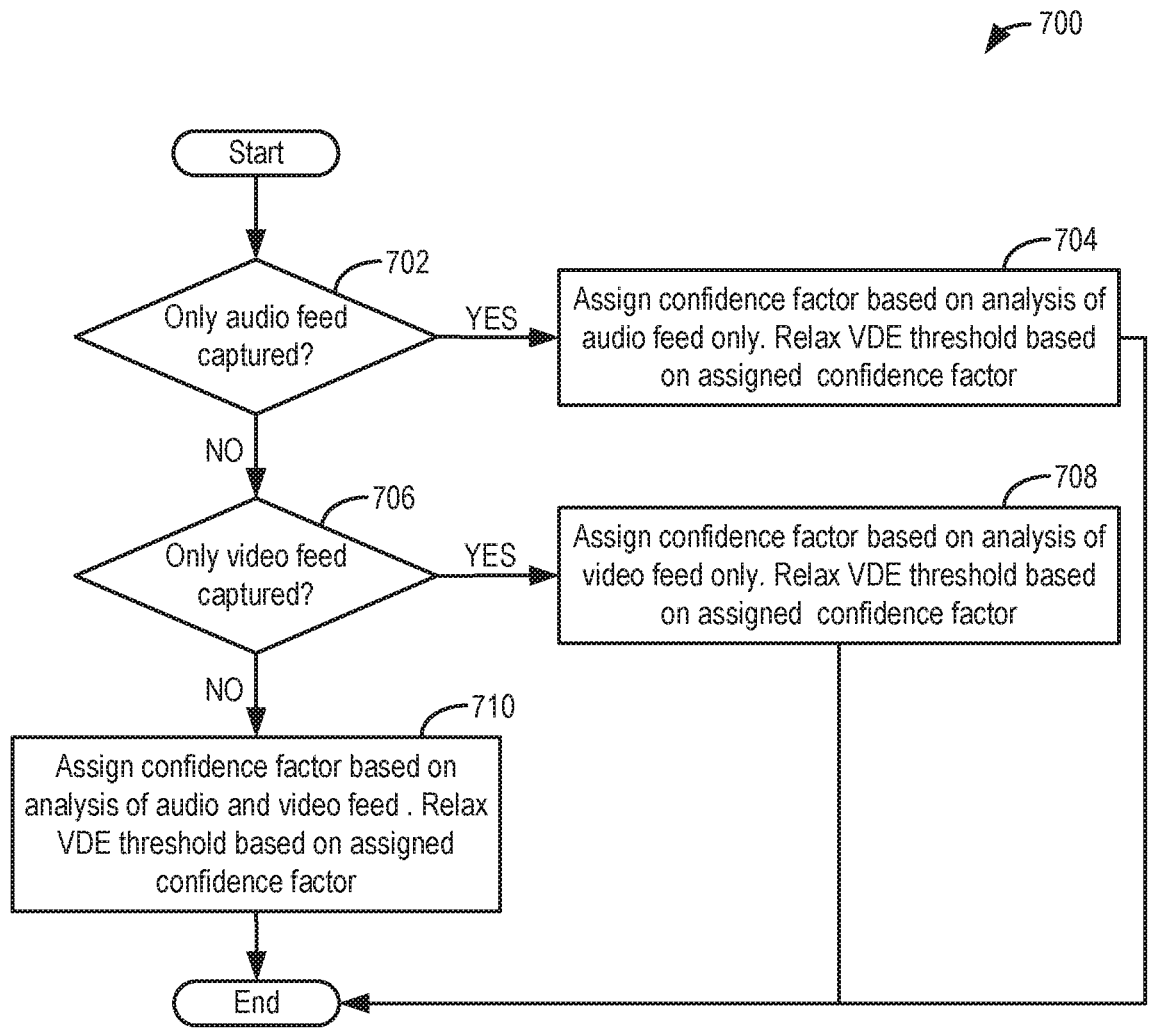
FIG. 7 shows a flow chart of an example method for adjusting VDE thresholds based on audio and/or video feed captured at a vehicle.

The following description relates to systems and methods for improving variable displacement engine (VDE) operation and vehicle drivability during conditions where engine cylinders may be deactivated to improve vehicle fuel efficiency. Cylinders of an engine as shown in FIGS. 1-2B may be selectively deactivated to improve engine fuel efficiency. Engine cylinders may be deactivated in an engine operating range defined by engine speed and load as shown in FIGS. 3A and 3B. An engine controller may execute a control routine, such as the example routine of FIG. 4 to opportunistically initiate a VDE transition during conditions when a vehicle driver is distracted and less likely to be inconvenienced by NVH associated with cylinder deactivation. Driver distraction may be inferred based on an analysis of audio and video feed captured at the vehicle, as shown at FIG. 5. The controller may also adjust engine speed and load thresholds at which a VDE transition is enabled based on the presence of audio and video feed, as shown at FIG. 7. FIG. 6 shows a prophetic example of adjusting VDE operations of an engine based on inferred driver distraction.

FIG. 1 schematically shows aspects of an example vehicle system 100, including an engine system 101 having an engine 10 coupled in a vehicle 102. In the depicted example, vehicle 102 is a hybrid electric vehicle with multiple sources of torque available to one or more vehicle wheels 47. However in alternate examples, vehicle system 100 may include a conventional non-hybrid powertrain. In the example shown, a powertrain of vehicle 102 includes engine 10 and an electric machine 52. Electric machine 52 may be a motor or a motor/generator. Engine 10 and electric machine 52 are connected to vehicle wheels 47 via a transmission 48 when one or more clutches 53 are engaged. In the depicted example, a (first) clutch 53 is provided between engine 10 and electric machine 52, and a (second) clutch 53 is provided between electric machine 52 and transmission 48. A controller 12 may send a signal to an actuator of each clutch 53 to engage or disengage the clutch, thereby connecting or disconnecting engine 10 from electric machine 52 and the components connected thereto and/or connecting or disconnecting electric machine 52 from transmission 48 and the components connected thereto. For example, torque from engine 10 may be transferred to vehicle wheels 47 via a crankshaft 40, transmission 48, and a powertrain shaft 84 when clutches 53 are engaged. Transmission 48 may be a gearbox, a planetary gear system, or another type of transmission. Transmission 48 may be a fixed ratio transmission that includes a plurality of gear ratios to allow engine 10 to rotate at a different speed than wheels 47. By changing a torque transfer capacity of first clutch 53 (e.g., an amount of clutch slippage), an amount of engine torque relayed to the wheels via powertrain shaft 84 (herein also referred to as the driveline) may be modulated. In the depicted example, electric machine 52 is an electric motor coupled in the drivetrain between the engine and the transmission. However, additional electric machines may be coupled to crankshaft 40.

The powertrain may be configured in various manners, including as a parallel, a series, or a series-parallel hybrid vehicle. In electric vehicle embodiments, a system electrical energy device, such as system battery 45 may be coupled to the driveline. System battery 45a may be a traction battery, for example a 48V battery that delivers electrical power to electric machine 52 to provide torque to vehicle wheels 47. In some embodiments, electric machine 52 may also be operated as a generator to provide electrical power to charge system battery 45, for example, during a braking operation using regenerative torque. It will be appreciated that in other embodiments, including non-electric vehicle embodiments, system battery 45 may be a typical starting, lighting, ignition (SLI) battery coupled to an alternator 46. It will be appreciated that while the system electrical energy storage device 45 is depicted herein as a battery, in other examples, the electrical energy storage device 45 may be a capacitor.

In the depicted embodiment, engine 10 is a boosted engine configured with a boosting device, herein shown as turbocharger 15. Turbocharger 15 includes compressor 114 that is mechanically coupled to, and driven by, turbine 116 via a shaft 19, the turbine 116 driven by expanding engine exhaust. In one embodiment, the turbocharger may be a twin scroll device. In another embodiment, the turbocharger may be a variable geometry turbocharger (VGT), wherein turbine geometry is actively varied as a function of engine operating conditions. Fresh air is introduced along intake passage 42 into engine 10 via air box 112 and flows to compressor 114. Air is then compressed at compressor 114 and introduced into engine 10.

Compressor 114 is coupled to a throttle valve 20 through a charge-air cooler (CAC) 18 (also referred to as an intercooler herein). Air flows from compressor 114 through CAC 18 and throttle valve 20 to an intake manifold 22. CAC 18 may be an air-to-air or water-to-air heat exchanger, for example. Intake manifold pressure (e.g., a pressure of the air charge within the intake manifold) may be determined using a manifold absolute pressure (MAP) sensor 124.

Intake manifold 22 is coupled to a series of combustion chambers 30 through a series of intake valves 150. The combustion chambers are further coupled to an exhaust manifold 36 via a series of exhaust valves 156. In the depicted embodiment, a single exhaust manifold 36 is shown. However, in other embodiments, the exhaust manifold may include a plurality of exhaust manifold sections. Configurations having a plurality of exhaust manifold sections may enable effluent from different combustion chambers to be directed to different locations in the engine system.

In one embodiment, each of the exhaust and intake valves may be electronically actuated or controlled. In another embodiment, each of the exhaust and intake valves may be cam actuated or controlled. Whether electronically actuated or cam actuated, the timing of exhaust and intake valve opening and closure may be adjusted for the desired combustion and emissions-control performance. For example, the cam timing may be adjusted via a variable cam timing system to move the intake and exhaust cams to a position that provides the optimal volumetric efficiency for the given operating conditions.

Combustion chambers 30 may be supplied one or more fuels, such as gasoline, alcohol fuel blends, diesel, biodiesel, compressed natural gas, etc. Fuel may be supplied to the combustion chambers via direct injection, port injection, throttle valve-body injection, or any combination thereof. In the depicted example, fuel is provided to each combustion chamber 30 via direct injection by a fuel injector 66 (while only one fuel injector is shown in FIG. 1, each combustion chamber includes a fuel injector coupled thereto). Fuel may be delivered to fuel injector 66 by a fuel system (not shown) including a fuel tank, a fuel pump, and a fuel rail. In the combustion chambers, combustion may be initiated via spark ignition and/or compression ignition.

As shown in FIG. 1, exhaust from exhaust manifold 36 is directed to turbine 116 to drive the turbine. When reduced turbine torque is desired, a portion of exhaust may be directed instead through a waste-gate 90, bypassing the turbine. A waste-gate actuator 92 (e.g., waste-gate valve) may be actuated open to relieve at least some exhaust pressure from upstream of turbine 116 to a location downstream of turbine 116 via waste-gate 90. By reducing exhaust pressure upstream of turbine 116, turbine speed may be reduced.

The combined flow from turbine 116 and waste-gate 90 flows through an emission control device 70. In general, emission control device 70 may include one or more exhaust after-treatment components configured to reduce an amount of one or more substances in the exhaust flow. For example, one exhaust after-treatment component may be configured to trap $NO_x$ from the exhaust flow when the exhaust flow is lean and to reduce the trapped $NO_x$ when the exhaust flow is rich. In other examples, an exhaust after-treatment component may be configured to disproportionate $NO_x$ or to selectively reduce $NO_x$ with the aid of a reducing agent. In still other examples, emission control device 70 includes a three-way catalyst configured to oxidize residual hydrocarbons and carbon monoxide while reducing $NO_x$ in the exhaust flow. Different exhaust after-treatment catalysts having any such functionality may be arranged in wash coats or elsewhere in emission control device 70, either separately or together. In some embodiments, the emission control device 70 may further include a regeneratable soot filter configured to trap and oxidize soot particles in the exhaust flow.

All or part of the treated exhaust from emission control device 70 may be released into the atmosphere via an exhaust conduit 35. Depending on operating conditions, however, some exhaust may be diverted instead to intake passage 42 via an exhaust gas recirculation (EGR) passage (not shown), including an EGR cooler and an EGR valve. EGR may be recirculated to the inlet of compressor 114.

One or more sensors may be coupled to the inlet of compressor 114. For example, a temperature sensor 55 may be coupled to the inlet of compressor 114 for estimating a compressor inlet temperature. As another example, a pressure sensor 56 may be coupled to the inlet of compressor 114 for estimating a pressure of air entering the compressor. Still other sensors may include, for example, air-fuel ratio sensors, humidity sensors, etc. In other examples, one or more of the compressor inlet conditions (such as humidity, temperature, pressure, etc.) may be inferred based on engine operating conditions. In addition, a throttle inlet pressure (TIP) sensor 59 may be coupled downstream of CAC 18 and upstream of throttle valve 20 for estimating a boost pressure delivered to the engine.

Engine 10 may be a variable displacement engine (VDE), having one or more cylinders 30 with selectively deactivatable intake valves 150 and selectively deactivatable exhaust valves 156. Therein, selected cylinders may be deactivated by shutting off the respective cylinder valves, as elaborated below. In one example, intake valves 150 and exhaust valves 156 are configured for electric valve actuation (EVA) via electric individual cylinder valve actuators. While the depicted example shows each cylinder having a single intake valve and a single exhaust valve, in alternate examples, each cylinder may have a plurality of selectively deactivatable intake valves and/or a plurality of selectively deactivatable exhaust valves.

In some examples, engine 10 may have additionally have selectively deactivatable (direct) fuel injectors 66 and the selected cylinders may be deactivated by shutting off the respective fuel injectors while maintaining operation of the intake and exhaust valves such that air may continue to be pumped through the cylinders.

During the deactivation, selected cylinders may be deactivated by closing individual cylinder valve mechanisms (e.g., VDE mechanisms), such as intake valve mechanisms, exhaust valve mechanisms, or a combination of both. Cylinder valves may be selectively deactivated via hydraulically actuated lifters (e.g., lifters coupled to valve pushrods), via a cam profile switching mechanism in which a cam lobe with no lift is used for deactivated valves, or via the electrically actuated cylinder valve mechanisms coupled to each cylinder. In addition, fuel flow to the deactivated cylinders may be stopped, such as by deactivating cylinder fuel injectors 66. In some examples, spark to the deactivated cylinders may also be stopped, such as by selectively controlling the vehicle ignition system to only deliver spark to active cylinders.

Figure 2A:
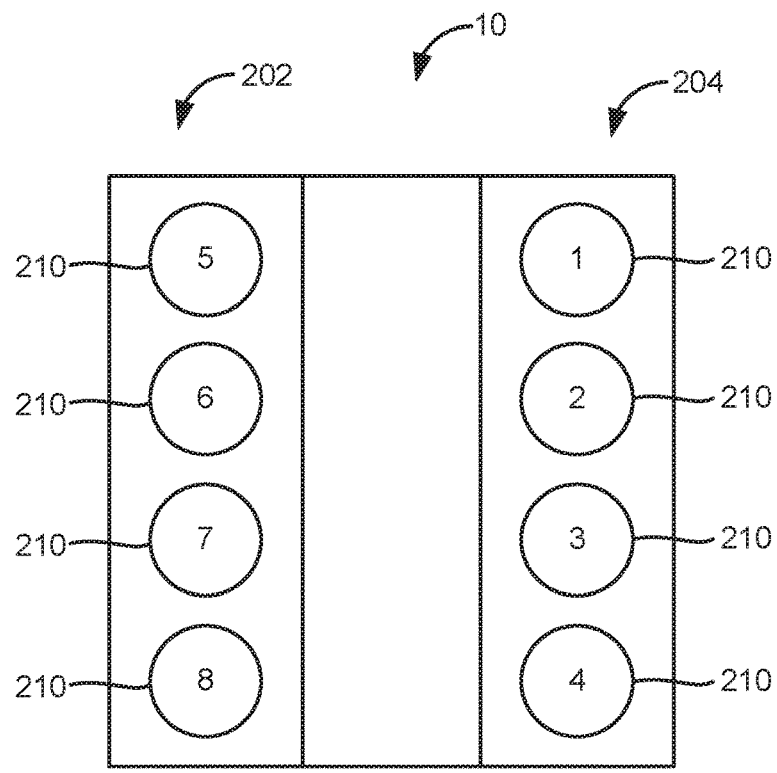
FIGS. 2A and 2B are schematic diagrams of example variable displacement engine configurations.
Figure 2B:
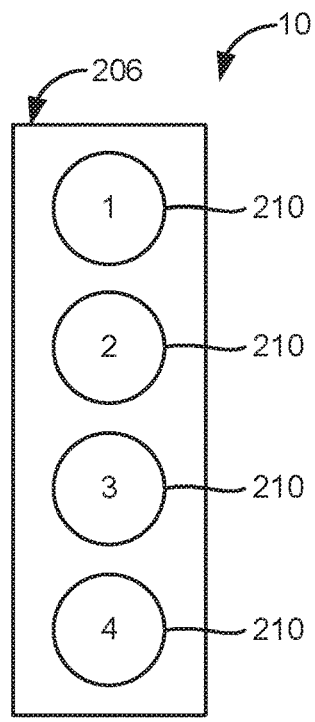

As elaborated at FIGS. 2A-2B, during selected conditions, such as when the full torque capability of the engine is not needed, one or more cylinders of engine 10 may be selected for selective deactivation (herein also referred to as individual cylinder deactivation). Engine controller 12 may continually analyze individual cylinders, determining whether to activate or deactivate each cylinder based on a driver's pedal position input and torque demands. As such, engine NVH may be elevated when at least some cylinders are deactivated due to engine torque variation and engine speed variation from desired values because of longer intervals between combustion events. This NVH may be objectionable to a vehicle driver, limiting the opportunities for VDE operation. As elaborated at FIG. 4, various vehicle sensors and devices may be used to capture audio and video feed from inside the vehicle to identify periods when the vehicle driver may be distracted, and therefore less likely to be offended by the NVH associated with cylinder deactivation. By opportunistically enabling VDE during those periods, if engine speed and load conditions are conducive for cylinder deactivation, additional VDE related fuel economy benefits can be achieved without dissatisfying the driver. Further, as elaborated at FIG. 7, the audio and video feed may be use to adjust engine speed and load thresholds at which VDE is enabled and disabled.

Various sensors and devices may be coupled to vehicle 102 for capturing audio and feed from within the vehicle, as well for capturing audio and video feed regarding an environment of the vehicle. Based on the audio and video feed, it may be determined by controller 12 if the driver is likely to notice any VDE related NVH. As elaborated at FIGS. 4-5, and 7, the captured audio and video feed may be analyzed to infer in a vehicle driver is distracted.

For example, the vehicle may include an audio system 170 for capturing audio feed from inside and outside the vehicle. Audio feed may be captured at audio system 170 at predefined intervals. The audio system 170 may include an entertainment system 172 for streaming audio input into the vehicle cabin, such as from a radio, a CD, or other music source. The entertainment system 172 may include in-cabin speakers 174 for streaming music from the music source into the vehicle cabin. If the volume setting of in-cabin speakers 174, as selected by the vehicle driver, is higher than a non-zero threshold, it may be inferred by the controller 12 that the driver is not likely to notice any NVH emanating from VDE controls.

As another example, audio system 170 may include audio sensors 176 for capturing sounds from the vehicle cabin. The captured sounds may include engine noise, motor noise, conversations between vehicle occupants, etc. The controller 12 may include software for analysis the sounds, such as voice-recognition software for identifying the vehicle driver's voice. Still other audio analysis and voice recognition techniques may be used to discern the voice of the driver from the different sounds captured in the vehicle cabin. If, based on the on-board voice recognition techniques, it is determined that the driver is engaged in an in-cabin conversation, then the controller 12 may infer that the driver is not likely to notice NVH emanating from VDE controls.

As yet another example, audio system 170 may include a connected device 179, such as a smartphone or music player. The connected device 179 may be communicatively coupled to the speakers 174 of the entertainment system 172, and an in-cabin microphone 178, such as via Bluetooth, Sync, or other software allowing for hands free control of the device. In particular, the connected device 179 may be operated via voice commands received from the vehicle driver at the microphone 178. In one example, the microphone 178 is positioned in the sun visor of the vehicle. During conditions when a vehicle occupant is speaking on the connected device 179, or providing voice commands on the microphone, they may be distracted and unlikely to observe NVH. Additionally, the microphone 178 may be repurposed to capture audio feed from the cabin which is then analyzed by voice-recognition techniques at the controller to determine if the driver is engaged in an in-cabin conversation. If so, the controller 12 may infer that the driver is not likely to notice NVH emanating from VDE controls.

Audio sensors 176 may also be used to capture audio feed from outside the vehicle cabin, such as in the vehicle's environment. For example, a first set of audio sensors may be coupled to an interior of the vehicle for capturing in-cabin audio feed while a second set of audio sensors may be coupled to an exterior of the vehicle for capturing ambient audio feed. Ambient sounds captured may include city noise, traffic noise, construction noise, etc., in the environment of the vehicle. If the ambient noise around the vehicle is elevated, it may be inferred that the noise may mask any VDE noise.

Likewise, the vehicle may include a video system 180 for capturing video feed from inside the vehicle cabin. The video system 180 may include a camera 182. In one example, a dashboard camera coupled to a dashboard of the vehicle cabin may be repurposed for capturing images of activity inside the cabin. As another example, a dedicated camera may be provided with a focal point focused on the driver for monitoring driver behavior. The video system 180 may additionally or optionally include a device for providing machine vision 184. The machine vision may capture video feed of an interior of the vehicle cabin. Likewise, the video system 180 may include in-cabin video sensors 184. The captured video feed may include still images, time lapsed images, and/or videos. Images may be captured at predefined intervals. The captured video feed be analyzed by image analysis software to identify behavior patterns of the vehicle driver. If the behavior patterns are indicative of distracted behavior, such as rapid eye movement, frequent hand movement, identification of specific gestures, etc. then it may be inferred that the driver is unlikely to notice the VDE associated NVH. Still other patterns indicative of a distracted driver include frequent or constant side to side head movement, eye movement indicating focus on outside scenery, hand movement/interaction with vehicle cabin controls (HMI), busy steering (e.g., vehicle drifting), frequent lane changes (e.g., in hurry to get to destination), erratic harsh braking, and vehicle speed that consistently mismatches the advertised or recommended road speed.

As elaborated at FIG. 7, the controller may infer that the driver is distracted with a confidence factor based on the captured and analyzed audio and video feed. As an example, driver distraction inferred based on only audio feed or only video feed may be assigned a lower confidence factor. In comparison, if both the audio feed and video feed is indicative of driver distracted behavior, then a higher confidence factor may be assigned. In response to the lower confidence factor, VDE thresholds (that is engine speeds and loads at which VDE is allowed to be initiated) may be extended by a first amount while responsive to the higher confidence factor, VDE thresholds may be extended by a second amount, larger than the first amount. For example, if cylinder deactivation is enabled when engine speed and engine load are in a first range, extending VDE thresholds by the first amount may include enabling cylinder deactivation when engine speed and engine load are in a second range including a higher engine speed and a higher engine load that the first range. Likewise, extending VDE thresholds by the second amount may include enabling cylinder deactivation when engine speed and engine load are in a third range including a higher engine speed and a higher engine load that the second range. As another example, if the default VDE threshold includes deactivating a first number of cylinders when engine speed and load are in a defined range, extending VDE thresholds by the first amount may include enabling a second number of cylinders, larger than the first number, to be deactivated when engine speed and engine load are in the given range, and extending VDE thresholds by the second amount may include deactivating a third number of cylinders, larger than the second number, to be deactivated when engine speed and engine load are in the given range.

Controller 12 may be included in a control system 14. Controller 12 is shown receiving information from a plurality of sensors 16 (various examples of which are described herein) and sending control signals to a plurality of actuators 81 (various examples of which are described herein). As one example, sensors 16 may include an exhaust gas sensor 126 located upstream of turbine 116, MAP sensor 124, an exhaust temperature sensor 128, an exhaust pressure sensor 129, compressor inlet temperature sensor 55, compressor inlet pressure sensor 56, a mass air flow (MAF) sensor 57, barometric pressure sensor 58, and TIP sensor 59. Other sensors, such as additional pressure, temperature, air/fuel ratio, and composition sensors, may be coupled to various locations in vehicle system 100. In addition or in place of the depicted sensors, the controller may infer or model values for pressures, temperatures and/or flow rates based on operating conditions. Input may also be received from still other vehicle sensors and devices, such as the various sensors, devices, and components of audio system 170 and video system 180.

The actuators 81 may include, for example, throttle valve 20, CCRV 62, electric motor 108, waste-gate actuator 92, BISG 114, and fuel injector 66. Still other actuators include microphone 178, in-cabin speakers 174, camera 182, etc. Controller 12 may receive input data from the various sensors, process the input data, and employ the various actuators to adjust vehicle and engine operation based on the received signals and instructions stored on a memory of the controller. The controller may employ the actuators in response to the processed input data based on instruction or code programmed therein corresponding to one or more routines, such as example control routines described herein with regard to FIG. 4. As an example, responsive to an indication from audio sensors that the sound level inside the vehicle cabin is higher than a threshold, or responsive to an indication from the audio and video sensors that the driver is engaged in in-cabin conversation, the controller may initiate a VDE transition. This may include deactivating a larger number of cylinders at a given engine speed-load condition responsive to elevated cabin noise or driver distraction.

During operation, each cylinder 30 within engine 10 typically undergoes a four stroke cycle: the cycle includes the intake stroke, compression stroke, expansion stroke, and exhaust stroke. During the intake stroke, generally, the exhaust valve 156 closes and intake valve 150 opens. Air is introduced into combustion chamber 30 via intake manifold 22, and a piston (not shown) moves to the bottom of the cylinder so as to increase the volume within combustion chamber 30. The position at which the piston is near the bottom of the cylinder and at the end of its stroke (e.g., when combustion chamber 30 is at its largest volume) is typically referred to by those of skill in the art as bottom dead center (BDC). During the compression stroke, intake valve 150 and exhaust valve 156 are closed. Piston moves toward the cylinder head so as to compress the air within combustion chamber 30. The point at which piston 36 is at the end of its stroke and closest to the cylinder head (e.g., when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug, resulting in combustion. During the expansion stroke, the expanding gases push piston back to BDC. Crankshaft 40 converts piston movement into a rotational torque of the rotary shaft. Finally, during the exhaust stroke, the exhaust valve 156 opens to release the combusted air-fuel mixture to exhaust manifold 36 and the piston returns to TDC. Note that the above is shown merely as an example, and that intake and exhaust valve opening and/or closing timings may vary, such as to provide positive or negative valve overlap, late intake valve closing, or various other examples.

Referring now to FIG. 2A, a first configuration of engine 10 is shown. Engine 10 includes two cylinder banks 202 and 204. First cylinder bank 204 includes cylinders 210 numbered 1-4. Second cylinder bank 202 includes cylinders 210 numbered 5-8. Thus, the first configuration is a V8 engine comprising two cylinder banks. All cylinders operating may be a first cylinder operating mode.

During select conditions, one or more of cylinders 210 may be deactivated via ceasing to flow fuel to the deactivated cylinders. Further, air flow to deactivated cylinders may cease via closing and holding closed intake and exhaust valves of the deactivated cylinders. The engine cylinders may be deactivated in a variety of patterns to provide a desired actual total number of activated or deactivated cylinders. For example, cylinders 2, 3, 5, and 8 may be deactivated forming a first pattern of deactivated cylinders and a second cylinder operating mode. Alternatively, cylinders 1, 4, 6, and 7 may be deactivated forming a second pattern of deactivated cylinders and a third cylinder operating mode. In still another example, cylinders 2 and 8 may be deactivated forming a third pattern of deactivated cylinders and a fourth cylinder operating mode. In yet another example, cylinders 3 and 5 may be deactivated forming a fourth pattern of deactivated cylinders and a fifth cylinder operating mode. In this example, five cylinder operating modes are provided; however, additional or fewer cylinder operating modes may be provided. If engine conditions are such that the engine may operate in any of the five cylinder modes described, the engine may be described as having five available cylinder operating modes. In this example, if two of the engine's five operating modes are not available, the engine may be described as having three available operating modes. The engine always has one available cylinder operating mode (e.g., all cylinders active and combusting air and fuel). Of course, the actual total number of available operating modes may be more than or less than five depending on the engine configuration.

Referring now to FIG. 2B, a second configuration of engine 10 is shown. Engine 10 includes one cylinder bank 206. Cylinder bank 206 includes cylinders 210 numbered 1-4. Thus, the first configuration is an I4 engine comprising one cylinder bank. All cylinders operating may be a first cylinder operating mode for this engine configuration.

Similar to the first configuration, one or more of cylinders 210 may be deactivated via ceasing to flow fuel to the deactivated cylinders. Further, air flow to deactivated cylinders may cease via closing and holding closed intake and exhaust valves of the deactivated cylinders. The engine cylinders may be deactivated in a variety of patterns to provide a desired actual total number of activated or deactivated cylinders. For example, cylinders 2 and 3 may be deactivated forming a first pattern of deactivated cylinders and a second cylinder operating mode. Alternatively, cylinders 1 and 4 may be deactivated forming a second pattern of deactivated cylinders and a third cylinder operating mode. In still another example, cylinder 2 may be deactivated forming a third pattern of deactivated cylinders and a fourth cylinder operating mode. In yet another example, cylinder 3 may be deactivated forming a fourth pattern of deactivated cylinders and a fifth cylinder operating mode. In this example, if engine conditions are such that the engine may operate in any of the five cylinder modes described, the engine may be described as having five available cylinder operating modes. If two of the engine's five operating modes are not available, the engine may be described as having three available operating modes. The engine always has one available cylinder operating mode (e.g., all cylinders active and combusting air and fuel). Of course, the actual total number of available operating modes may be more than or less than five depending on the engine configuration.

In still other examples, different cylinder configurations may be provided. For example, the engine may be a V6 engine or a V10 engine. The different engine configurations may also have different numbers of cylinder operating modes.

Referring now to FIG. 3A, an example cylinder deactivation region 302 for an eight cylinder engine is shown. Cylinder deactivation region 302 is shown as being rectangular, but it may be defined by other polygons or shapes such as a curve that defines a region. Region 302 is defined by a first engine speed 304, a second engine speed 306, a first engine torque 308, and a second engine torque 310. The second engine speed 306 is greater than the first engine speed 304. The second engine torque 310 is greater than the first engine torque 308. Cylinder modes where four and eight cylinders are active may be available within region 302. Eight cylinder mode is the only cylinder mode available outside of region 302. Modes with two active (e.g., cylinders in which air and fuel is combusted) cylinders are not available in region 302. Cylinder modes may not be available due to engine noise and vibration. Thus, the actual total number of available cylinder modes is greater inside of cylinder deactivation region 302 than outside of cylinder deactivation region 302. Such a cylinder deactivation region may be applied when a vehicle is traveling while the driver is not in a distracted state, when the vehicle is not in an autonomous mode, or when the vehicle is not a shared vehicle. The relatively small size of region 302 and the cylinder modes that are available within region 302 reduces the possibility of providing objectionable vehicle operating conditions to vehicle occupants. The scale of FIG. 3A is the same as for FIG. 3B.

Referring now to FIG. 3B, an example second cylinder deactivation region 320 for an eight cylinder engine is shown as a solid line. Cylinder deactivation region 302 is shown as being trapezoidal, but it may be defined by other polygons or shapes such as a curve that defines a region. Region 320 is defined by a first engine speed 322, a second engine speed 324, a first engine torque 326, and a second engine torque 326. The second engine speed 324 is greater than the first engine speed 322. The second engine torque 328 is greater than the first engine torque 326.

Cylinder deactivation region 330 is outlined via a dotted line. Region 330 is defined by a first engine speed 322, a second engine speed 323, a first engine torque 326, and a second engine torque 327. The second engine speed 323 is greater than the first engine speed 322. The second engine torque 327 is greater than the first engine torque 326.

Thus, FIG. 3B shows two cylinder deactivation regions. Cylinder modes where four and eight cylinders are active may be available within region 320. Eight cylinder mode is the only cylinder mode available outside of region 320 and outside of region 330. Cylinder modes with two active cylinders, four active cylinders, and eight active cylinders are available in region 330. Cylinder modes may not be available due to engine noise and vibration. Thus, the actual total number of available cylinder modes is greater inside of cylinder deactivation region 330 than inside of region 320 or outside of cylinder deactivation regions 330 and 320. Such a cylinder deactivation region may be applied when a vehicle is traveling while the driver is determined to be in a distracted state, when the vehicle is in an autonomous (self-driving) mode, or when the vehicle is a shared vehicle. The larger region comprising region 320 and 330 increases the possibility of improving vehicle fuel economy. Further, the additional cylinder modes available in region 330 may also further increase fuel economy. As such, when the vehicle driver is distracted, such as when they are engaged in conversation, engine noise and vibration that may be due to deactivating engine cylinders may be less noticeable, allowing the engine operating region where cylinder deactivation modes that are available to increase. Further, the actual total number of available cylinder modes may be increased when in-vehicle or ambient noise is elevated, the in-vehicle or ambient noise masking engine noise and vibration from VDE related NVH. Finally, when the vehicle is self-driving or when the vehicle is shared, the vehicle operator or vehicle occupant may not be highly vested in the vehicle, and more willing to tolerate intermittent engine noise from cylinder deactivation.

In some examples, as depicted, cylinder deactivation region 320 may include a first sub-region 320a corresponding to the lower speed and torque part of region 320 and a second sub-region 320b corresponding to the higher speed and torque part of region 320. The total number of cylinder modes available in region 320 may be divided symmetrically or asymmetrically between regions 320a and 320b. As an example, two cylinder modes (with relatively higher NVH) may be limited to region 320b while four cylinder modes (with relatively lower NVH) may be limited to region 320a. When the vehicle is self-driving and there is a vehicle occupant, or when the vehicle is shared, or when the driver is distracted (to a smaller degree), cylinder deactivation may be extended to region 320a. When the vehicle is self-driving and there is no vehicle occupant or when the driver is distracted (to a higher degree), cylinder deactivation may be further extended to region 320b.

In some examples, as elaborated at FIG. 7, the controller may select between the regions based on a confidence factor pertaining to driver distraction, the confidence factor determined based on audio and video feed captured in the vehicle. For example, driver distraction inferred based on only audio feed or only video feed may be assigned a lower confidence factor. In comparison, if both the audio feed and video feed is indicative of driver distracted behavior, then a higher confidence factor may be assigned. In response to the lower confidence factor, VDE thresholds may be extended from region 330 to region 320a. In response to the higher confidence factor, VDE thresholds may be extended from region 330a to each of region 320a and 320b (or from 320a to 320b).

In this way, the components of FIGS. 1 and 2A-2B enable a vehicle system comprising: an engine having a plurality of selectively deactivatable engine cylinders; a vehicle cabin including speakers, a camera, and a microphone; a driver actuated button for transitioning the vehicle system between an autonomous mode and a driven mode upon actuation of the button; and a controller with computer-readable instructions stored on non-transitory memory that when executed cause the controller to: deactivate one or more of the selectively deactivatable engine cylinders responsive to engine operation in a first engine speed-load range when the button is not actuated, the first engine speed-load range adjusted as a function of audio feed and video feed captured at the vehicle; and deactivate one or more of the selectively deactivatable engine cylinders responsive to engine operation in a second engine speed-load range when the button is actuated, the second engine speed-load range including a higher engine speed and a higher engine load than the first engine speed-load range. The controller may also include further instructions for adjusting a number of the one or more cylinders deactivated in the first engine speed-load range as another function of the audio feed and video feed captured at the vehicle, wherein the number of the one or more cylinders deactivated in the second engine speed-load range is higher than the number of the one or more cylinders deactivated in the first engine speed-load range. For example, the controller may capture the audio feed via the speakers and the microphone, an upper engine speed and an upper engine load of the first engine speed-load range raised when the captured audio feed includes a higher than threshold setting of the speakers or an indication of driver speech; and capture the video feed via the camera, the upper engine speed and the upper engine load of the first engine speed-load range raised when the captured video feed includes gestures indicative of driver distracted behavior. In one example, the upper engine speed and upper engine load of the first engine speed-load range is raised by a smaller amount when one of audio feed and video feed is captured, and wherein the engine speed-load range is raised by a larger amount when each of audio feed and video feed is captured.

Figure 4:
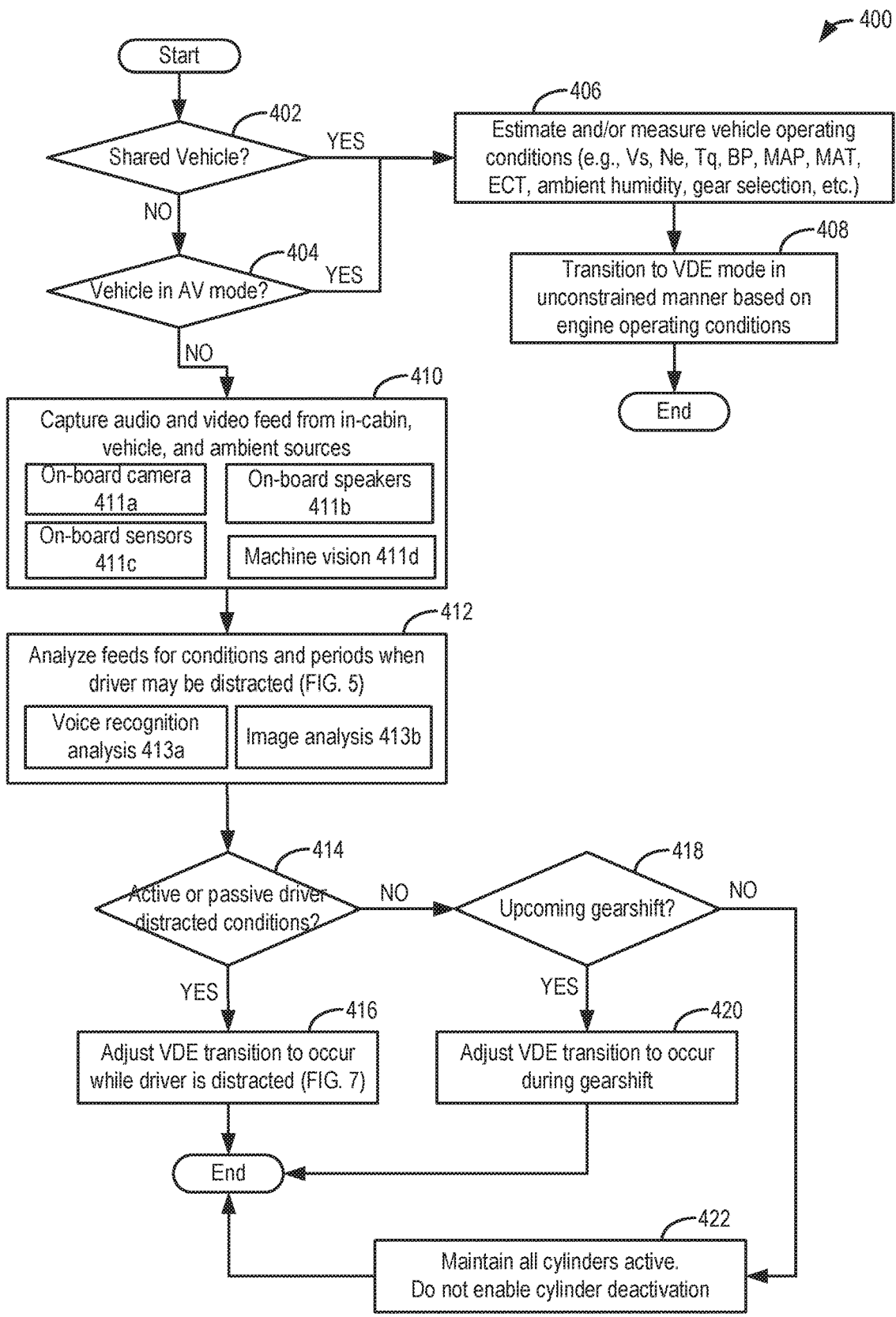
FIG. 4 shows a flow chart of an example method for controlling an engine to reduce customer dissatisfaction due to NVH associated with cylinder deactivation.

Turning now to FIG. 4, an example method 400 is shown for adjusting enablement of cylinder deactivation based on an indication of driver distraction. The method enables cylinder deactivation to be opportunistically provided during conditions when NVH associated with the cylinder deactivation is likely to be masked or otherwise less likely to be perceived (and objected to) by a vehicle operator. By initiating a VDE transition without dissatisfying a vehicle operator, cylinder deactivation can be provided over a wider range of vehicle operating conditions, improving fuel economy. Instructions for carrying out method 400 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

At 402, the method includes confirming if the vehicle is a shared vehicle. For example, it may be determined if the vehicle is being operated in a shared mode with multiple operators sharing the vehicle. Alternatively, it may be determined if the vehicle is being operated in a cab hailing mode. In certain ride sharing embodiments, a vehicle may be used by a vehicle operator as a personal vehicle during some periods and as a shared vehicle or cab during other periods. The vehicle operator may indicate that the vehicle is being operated as a shared vehicle via a button on the dashboard, or via an application (e.g., payment gateway) running on the vehicle's central console.

If the vehicle is in a shared mode, or when the vehicle is being operated as a cab, a vehicle operator may be transient owner who may not have a vested interest in the vehicle engine's smoothness. For example, the car sharing experience may be a "one and done" transaction and the occupant may not be likely to complain about engine roughness as long as the vehicle performs the main task of transporting the customer to the desired location. Accordingly, if the vehicle is a shared vehicle, the method moves to 406.

If the vehicle is not a shared vehicle, then at 404, it may be determined if the vehicle is operating in an autonomous (AV) or self-driving mode. The vehicle may be operated as an autonomous vehicle via actuation of a button on the dashboard. When the vehicle is driverless, and without occupants, maximum NVH that can be tolerated allowing the engine controller to control VDE operations with full liberty. Even if there are occupants in the vehicle, they may be transient occupants who may not have a vested interest in the vehicle engine's smoothness. Accordingly, if the vehicle is a shared vehicle, the method moves to 406.

At 406, the method includes estimating and/or vehicle and engine operating conditions such as engine speed, vehicle speed, driver torque demand, MAP, MAT, ambient conditions such as ambient humidity, pressure, and temperature, boost pressure, engine dilution, gear selection, etc. At 408, the method includes transitioning to a VDE mode in an unconstrained manner, or with fewer constraints, based on the engine operating conditions. In one example, transitioning to the VDE mode with fewer constraints includes increasing the actual total number of available cylinder modes. For example, with reference to FIG. 3B, the controller may transition from operating only with cylinder deactivation region 320 to also including cylinder deactivation region 330. That is, cylinder deactivation may be initiated and completed if engine speed and load conditions are within any of regions 320 and 330. Further, any of the cylinder modes available within regions 320 and 330 can be selected, as desired based on the operating conditions. As another example, the controller may extend from operating only within cylinder deactivation region 320 to also operating in cylinder deactivation region 330$a$ and 330$b$. In still another example, engine speed and load thresholds at which cylinder deactivation is enabled may be extended to include higher engine speeds and loads. The method then ends.

If the vehicle is neither a shared vehicle, nor a vehicle being operated autonomously, then at 410, the method includes capturing audio and video feed from within the vehicle cabin as well as from ambient sources surrounding the vehicle. Specifically, images and sounds of activity within the vehicle, as well as sounds outside the vehicle, may be captured. The captured images and sounds may include a continuous feed, such as feed captured continuously while the vehicle is travelling with the engine combusting fuel. Alternatively, images and sounds may be captured intermittently, at defined intervals. These intervals may be predefined based on duration of distance of travel (e.g., every second, every minute, every mile of vehicle travels, etc.), and may be further based on vehicle parameters such as vehicle speed, or road grade. As used herein, captured video feed refers to images (e.g., still images) as well as videos. In addition, audio and video feed may be captured together in a video.

Audio and video feed may be captured by various vehicle sensors and devices, such as via an on-board camera at 411$a$, via on-board speakers at 411$b$, via on-board sensors at 411$c$, and via machine vision at 411$d$. Still other devise included microphones, audio sensors, video sensors, communicatively connected devices, etc. For example, as elaborated at FIG. 1, the on-board speaker and microphone may be components of a vehicle entertainment system that are repurposed for capturing vehicle cabin audio input (instead of providing audio output to the vehicle cabin). Likewise, the on-board camera and machine vision may be repurposed for capturing vehicle cabin video input (instead of capturing video of areas visible from the vehicle cabin).

At 412, the captured audio and video feed is analyzed for conditions and periods when the driver is distracted, and therefore less likely to notice engine NVH from cylinder deactivation. As elaborated at FIG. 5, this may include performing voice recognition analysis of the audio feed at 413$a$, and performing image analysis of the video feed at 413$b$. For example, the audio feed may be analyzed to identify the driver's voice and determine if they are engaged in in-cabin conversation. Likewise, the video feed may be analyzed to identify the driver's behavior.

At 414, it may be determined if driver distracted conditions are present. These may be actively distracted or passively distracted conditions. The driver may be determined to be actively distracted when, for example, the analyzed audio or video feed indicates that the driver is engaged in conversation. In other words, the driver may be actively distracted when the audio or video feed indicates that they are active in communicating. The driver may be determined to be passively distracted when, for example, in-cabin noise level is elevated (such as due to loud music being streamed to the speakers, or due to ambient noise percolating into the vehicle cabin, etc.).

If the driver is inferred to be distracted, then at 416, the method includes adjusting a VDE schedule to opportunistically occur while the driver is distracted and therefore unlikely to perceive the VDE associated NVH. Adjusting the VDE schedule may include initiating a transition to the VDE mode as soon as engine speed-load conditions are conducive to cylinder deactivation, and with fewer constraints. Adjusting the VDE schedule may further include increasing the actual total number of available cylinder modes. For example, with reference to FIG. 3B, the controller may transition from operating only with cylinder deactivation region 320 to also including cylinder deactivation region 330. That is, cylinder deactivation may be initiated and completed if engine speed and load conditions are within any of regions 320 and 330. Further, any of the cylinder modes available within regions 320 and 330 can be selected, as desired based on the operating conditions. As another example, the controller may extend from operating only within cylinder deactivation region 320 to also operating in cylinder deactivation region 330a.

As a further example, as elaborated with reference to FIG. 7, the controller may extend engine speed and load thresholds for VDE operation based on a confidence factor pertaining to the driver distraction, as inferred from a comparison of the audio feed and the video feed. For example, if only the audio feed is available, only the video feed is available, or both feeds are available but only one of them is indicative of distracted driver behavior, then driver distraction is inferred with a lower confidence factor and VDE operations are extended to a first engine speed-load range beyond the default VDE speed-load range. This first range may include engine speeds and loads higher than and lower than the engine speeds and loads of the default range. If both the audio and video feeds are available and both are consistent in indicating distracted driver behavior, then driver distraction is inferred with a higher confidence factor and VDE operations are extended to a second engine speed-load range extending further beyond the default range and the first engine speed-load range. This second range may include engine speeds and load higher than and lower than the engine speeds and loads of the first range.

In still another example, responsive to a lower confidence factor based on audio only or video only feed, a first number of cylinder deactivation modes, larger than the number of default cylinder deactivation modes, are enabled. In contrast, responsive to a higher confidence factor, based on each of audio and video feed, a second number of cylinder deactivation modes, larger than the first number of cylinder deactivation modes, are enabled. As an example, the default cylinder deactivation mode for an 8 cylinder engine may include a 4 cylinder mode, the first number of cylinder deactivation modes may extend the options to also include (in addition to the 4 cylinder mode) a 2 and a 3 cylinder mode, while the second number of cylinder deactivation modes may extend the options to also include (in addition to the 4 cylinder mode) a 5 and a 6 cylinder mode. The method then ends.

If driver distracted conditions are not confirmed, then at 418, the method includes confirming an upcoming gear shift. The upcoming gear shift may be a gear upshift or downshift that is expected within a threshold duration or distance of travel. An upcoming gear shift may be confirmed based on navigational input, such as from a GPS, including road grade, traffic conditions, vehicle speed (current and expected), etc. The upcoming gear shift may be further based on drive history including how aggressively a driver tends to operate the vehicle, a performance setting selection (e.g., sport mode, off-road mode, economy mode, etc.), as well as current engine speed and load conditions. If a gearshift is upcoming, then the VDE transition may be scheduled to occur during the gearshift so that NVH associated with cylinder deactivation can be masked by the noise associated with a gearshift. Consequently, the operator may not be dissatisfied as they may be more tolerant of the gearshift noise. The method then ends.

If the driver is not determined to be distracted, and no upcoming gearshift can be confirmed either, then at 422, the method includes maintaining all cylinders active and disabling cylinder deactivation modes. For example, with reference to FIG. 3B, the controller may confine engine operation to a region outside of regions 320 and 330, where all cylinders are maintained active with fuel and valve operation enabled, even if engine speed and load conditions are conducive for cylinder deactivation. In this way, NVH transitions are not allowed during conditions when a vehicle operator is most likely to perceive and object to the noise associated with the NVH transition.

It will be appreciated that in addition to enabling a VDE transition to occur while the driver is distracted, the controller may also enable the VDE transition to occur while the vehicle is travelling on a bumpy road, where the noise and vibration from the bumpy road can mask the NVH associated with the VDE transition.

Turning now to FIG. 5, an example method is shown for analyzing audio and video feed captured at a vehicle to infer if conditions are present for a driver to not be able to perceive or object to VDE related NVH. In one example, the method of FIG. 5 may be performed as part of the method of FIG. 4, such as at 412.

At 502, the method includes applying voice recognition and related audio analyses on captured audio feed. For example, voice recognition software or on-board voice recognition techniques may be applied to learn the driver's voice from among the captured sounds. If the driver is engaged in in-cabin conversation, they may not be likely to notice the NVH. As another example, if the audio analysis indicates that the driver is operating a connected device (e.g., Sync device) which has a microphone, such as when the driver is speaking on the device to give voice commands, or when the driver is using the connected device to talk with another person via telephonic communication, the operator is less likely to notice the NVH as it is not the acoustic focal point of interest.

Based on the analysis, it is determined if the driver is engaged in conversation (either with other vehicle occupants, or to give voice commands, or via a connected device), then the method moves to 516 to enable a VDE transition if engine speed-load conditions permit cylinder deactivation. For example, a larger number of cylinder modes are made available and the engine can transition to any of the available modes. For example, an 8-cylinder engine can transition to a 4-cylinder or 2-cylinder mode substantially immediately.

If the driver is not engaged in conversation, then at 506, it may be determined if the volume of the in-cabin speakers is higher than a threshold. If so, it may be inferred that the in-cabin volume is high enough to mask any VDE associated noise and therefore not be objectionable to the operator. Therefore, if the volume of the in-cabin speakers is higher than the threshold, then the method moves to 516 to enable a VDE transition if engine speed-load conditions permit cylinder deactivation.

If the volume of the in-cabin speakers is below the threshold, the method to 508 to confirm if ambient noise is higher than a threshold. In one example, the noise threshold for ambient noise may be different (e.g., higher or lower) than the noise threshold for in-cabin noise (due to driver conversation or speakers). In another example, the different noise thresholds may be a common noise threshold that is elevated enough to mask engine noise. If the ambient noise is higher than the threshold, it may be inferred that the ambient noise perceived by the operator is high enough to mask any VDE associated noise and therefore not be objectionable to the operator. Accordingly, if the ambient noise is higher than the threshold, then the method moves to 516 to enable a VDE transition if engine speed-load conditions permit cylinder deactivation.

Else, if the audio feed is not indicative of conditions where the engine noise may be masked, then at 514, the method includes maintaining all cylinders active and not enabling cylinder deactivation at this time. For example, none of the cylinder deactivation modes may be permitted to avoid generating noise that is objectionable to the driver.

In parallel to analyzing the audio feed at 502, the controller may also analyze the video feed to determine if the driver is distracted. Specifically, while analyzing the audio feed at 502, the controller may concurrently analyze the video feed at 510. Analyzing the video feed may include observing driver behavioral trends including tracking hand movement, eye movement tracking, gestures, etc. Visual context and artificial intelligence may be used to monitor the vehicle driver and detect whether they are engaging in distracted behavior. As an example, the controller may infer distracted behavior if the driver's eyes are paying attention to (focusing on) something other than the road. Other gestures indicative of distracted driver behavior include frequent side to side head movement, eye focus on outside scenery, hand movement/interaction with vehicle cabin controls (HMI), busy steering (vehicle drifting), constant lane changes (in hurry to get to destination), erratic harsh braking, and vehicle speed that consistently mismatches the advertised road speed.

At 512, it may be determined if the behavior profile of the driver, as based on the analysis of the video feed, is indicative of a distracted driver. In one example, the controller may assign the driver a rating having a numerical value corresponding to a degree of distracted behavior. The higher the rating, the higher the likelihood that the driver is distracted. If the rating is higher than a defined non-zero threshold, then it may be determined that the driver is distracted and unlikely to be distracted by any engine noise. Accordingly, if the driver is indicated to be distracted, then the method moves to 516 to enable a VDE transition if engine speed-load conditions permit cylinder deactivation. Else, the if the video feed is not indicative of conditions where the engine noise may be less likely to be perceived by the driver, then at 514, the method includes maintaining all cylinders active and not enabling cylinder deactivation at this time. For example, none of the cylinder deactivation modes may be permitted to avoid generating noise that is objectionable to the driver.

Turning now to FIG. 7, another example method is shown for analyzing audio and video feed captured at a vehicle to infer if conditions are present for a driver to not be able to perceive or object to VDE related NVH. In one example, the method of FIG. 7 may be performed as part of the method of FIG. 4, such as at 416. The method of FIG. 7 may also be included within the method of FIG. 5. Method 700 enables driver distraction to be confirmed with a confidence factor based on the captured and analyzed audio and video feed, and for VDE operations to be calibrated as a function of the confidence factor.

At 702, the method includes confirming if only (reliable) audio feed has been captured. In one example, only audio feed may be captured if the vehicle does not have a device for capturing video feed, if the device for capturing video feed is not functional, or if the quality of the captured video feed is not high enough for analysis. If only audio feed is available, at 704, the method includes assigning a confidence factor based on the analysis of audio feed only and relaxing VDE thresholds based on the assigned confidence factor.

At 706, the method includes confirming if only (reliable) video feed has been captured. In one example, only video feed may be captured if the vehicle does not have a device for capturing audio feed, if the device for capturing audio feed is not functional, if the cabin speakers are not functional, or if the quality of the captured audio feed is not high enough for analysis. If only video feed is available, at 708, the method includes assigning a confidence factor based on the analysis of video feed only and relaxing VDE thresholds based on the assigned confidence factor.

If both audio and video feed is available, then at 710, the method includes assigning a confidence factor based on the analysis of audio and video feed and relaxing VDE thresholds based on the assigned confidence factor. Herein the confidence factor assigned based on both the audio and video feed is expected to be higher than the confidence factor assigned based on only the audio feed or only the video feed. The method then ends.

As an example, a first confidence factor indicative of driver distraction may be inferred when only audio feed is available while a second confidence indicative of driver distraction may be inferred when only video feed is available. The first confidence factor may be higher or lower than the second confidence factor based on an analysis of the feed. For example, the first confidence factor may increase as a frequency of driver speech in the audio feed increases, as based on voice recognition analysis of the audio feed. As another example, the second confidence factor may increase as a frequency of eye movement or hand gestures associated with distracted behavior increases in the video feed, as based on gesture analysis of the audio feed. In comparison, if both the audio feed and video feed is indicative of driver distracted behavior, then a third confidence factor, higher than each of the first or the second confidence factor may be assigned. In response to the lower (first or second) confidence factor, VDE thresholds (that is engine speeds and loads at which VDE is allowed to be initiated) may be extended by a smaller amount while responsive to the higher (third) confidence factor, VDE thresholds may be extended by a larger amount, larger than the first amount. For example, if cylinder deactivation is enabled when engine speed and engine load are in a first range, extending VDE thresholds by a smaller amount may include enabling cylinder deactivation when engine speed and engine load are in a second range including a higher engine speed and a higher engine load that the first range. Likewise, extending VDE thresholds by the larger amount may include enabling cylinder deactivation when engine speed and engine load are in a third range including a higher engine speed and a higher engine load that the second range.

As another example, if the default VDE threshold includes deactivating a first number of cylinders when engine speed and load are in a defined range, extending VDE thresholds by the smaller amount responsive to the lower confidence factor may include enabling a second number of cylinders, larger than the first number, to be deactivated when engine speed and engine load are in the given range, and extending VDE thresholds by the larger amount responsive to the higher confidence factor may include deactivating a third number of cylinders, larger than the second number, to be deactivated when engine speed and engine load are in the given range.

Turning now to FIG. 6, a prophetic example of adjusting VDE transitions responsive to driver distraction is shown. Map 600 depicts accelerator pedal position at plot 602. The accelerator pedal position is indicative of driver torque demand. Engine speed is shown at plot 604. Typically, a transition between VDE and non-VDE modes is based on engine speed and load changes. In-cabin audio levels, as inferred based on an analysis of audio feed captured at the vehicle, if depicted at plot 606. When the audio levels are higher than threshold 605, it may be inferred that the in-cabin noise is likely to mask engine noise, allowing for cylinder deactivation to occur without inconveniencing the driver. A driver distracted state is indicated at plot 608. The driver distracted state may be based on captured audio feed or video feed. For example, the driver may be indicated to be distracted when the in-cabin audio level is elevated or when the in-cabin audio analysis indicates the driver is engaged in conversation. Alternatively, the driver may be indicated to be distracted based on video analysis of the captured video feed, such as when the driver is indicated to be intermittently interacting with a synchronized device. A cylinder mode of operation is shown at plot 610. For simplicity, the only modes shown are a VDE mode where half the total number of cylinders are active, and a non-VDE mode where all cylinders are active. However, it will be appreciated that in other examples, a number of VDE modes may be possible, each with a different total number of deactivated cylinders (relative to active cylinders). For example, in an 8 cylinder engine, the different modes may include a 4-cylinder mode, a 6 cylinder mode, and a 2 cylinder mode. Vehicle operation via a driver versus via autonomous operation (AV) is depicted at plot 612. When the vehicle is in an AV mode, there is no driver and the vehicle is being self-driven. The vehicle may or may not have occupants while in the AV mode, such as based on whether the car is being self-driven to pick up a customer from a location or to transport a customer to a location.

Prior to t1, the operator torque demand is elevated, as indicated by accelerator pedal depression. At this time, cylinder deactivation is not desired as all cylinders are required to be active to meet the torque demand. Accordingly, the engine operates in the non-VDE mode. Also at this time, the in-cabin audio is lower than threshold 605, and the driver is not distracted. Shortly before t1, however, the in-cabin audio exceeds the threshold 605, such as due to the driver operating cabin speakers to listen to music. The driver is inferred to be distracted at this time. Even though the driver is distracted and unlikely to hear any engine noise associated with cylinder deactivation, the non-VDE mode is maintained due to the elevated engine speed and torque demand.

At t1, there is a drop in torque demand that can be met by operating fewer cylinders. Since the in-cabin noise is above the threshold 605 and the driver is indicated to be distracted, the engine is opportunistically transitioned to the VDE mode by deactivating engine cylinders. Herein, the transition to the VDE mode occurs while the driver is less likely to perceive the noise or object to it. This allows for the fuel economy associated with VDE operation to be achieved.

Shortly before t2, there is a gradual rise in torque demand. However, the engine speed and load remains low enough for the torque demand to be met by operating fewer than the full complement of engine cylinders. However, at t2, the in-cabin audio noise falls below threshold 605, such as due to the driver turning off the cabin speakers. As a result, the driver is not distracted anymore and is more likely to perceive the engine noise. Therefore, the engine is transitioned back to the non-VDE mode by reactivating previously deactivated cylinders.

At t3, while the torque demand remains conducive to cylinder deactivation, and the in-cabin audio is below the threshold 605, the driver is inferred to be in a distracted state based on analysis of captured video feed (not shown). Since the driver is unlikely to notice the VDE associated NVH at this time, the controller opportunistically transitions the engine to the VDE mode by deactivating one or more cylinders. At t4, based on the video feed, it is inferred that the driver is not distracted anymore. Since the in-cabin audio continues to remain below the threshold 605, the engine is transitioned out of the VDE mode by reactivating the deactivated engine cylinders and operating with all cylinders active.

At t5, the vehicle is transitioned to an AV mode. For example, the vehicle driver may exit the vehicle and the vehicle may be commanded to drive itself to an alternate location to pick-up another driver. Therefore at this time there is no vehicle occupant. Accordingly at t5, the engine is transitioned between VDE and non-VDE modes in an unconstrained manner.

In this way, NVH intrusiveness due to VDE operation is reduced. By masking noises associated with a VDE event with in-cabin noise, ambient noise, or driver distraction, the technical effect that is achieved is that the risk for NVH observation, and objection to it, is lowered. As such, this reduces the potential for complaints. By opportunistically enabling VDE transitions to occur during conditions when a driver is least likely to notice the associated NVH, cylinder deactivation can be provided over a wider range of engine operating conditions, improving overall vehicle fuel economy.

One example vehicle method comprises: initiating a transition between operating an engine with more active cylinders to operating with fewer active cylinders in response to one or more of audio and video feed captured at the vehicle. In the preceding example, additionally or optionally, initiating in response to the audio or video feed includes initiating in response to the one or more of audio and video feed being indicative of a vehicle driver being actively or passively in a distracted state. In any or all of preceding examples, additionally or optionally, the method further comprises capturing audio feed of sound inside a vehicle cabin and analyzing the captured audio feed via voice recognition software to identify a voice of the vehicle driver. In any or all of preceding examples, additionally or optionally, initiating the transition in response to the audio feed includes initiating the transition in response to the captured audio feed indicative of the vehicle driver engaged in in-cabin conversation. In any or all of preceding examples, additionally or optionally, the method further comprises capturing video feed of driver behavior inside a vehicle cabin and analyzing the captured video feed via image analysis software to identify a behavioral state of the vehicle driver. In any or all of preceding examples, additionally or optionally, initiating the transition in response to the video feed includes initiating the transition in response to the captured video feed indicative of the vehicle driver being in the distracted state, the distracted state including driver eyes focusing on something other than a road of vehicle travel. In any or all of preceding examples, additionally or optionally, audio feed includes audio feed from in-cabin speakers, and wherein imitating the transition in response to the audio feed includes initiating the transition in response to a volume setting of the speakers being higher than a threshold based on vehicle speed. In any or all of preceding examples, additionally or optionally, audio feed includes audio feed of ambient noise from an environment of the vehicle, and wherein imitating the transition in response to the audio feed includes initiating the transition in response to the ambient noise being higher than a threshold based on vehicle speed. In any or all of preceding examples, additionally or optionally, initiating in response to one or more of the audio and video feed includes assigning a confidence factor to the distracted state of the driver based on the one or more of the audio and video feed; and extending an engine speed-load threshold, beyond a default threshold for cylinder deactivation, as a function of the assigned confidence factor. In any or all of preceding examples, additionally or optionally, the extending includes initiating the transition between operating an engine with more active cylinders to operating with fewer active cylinders at a higher engine speed and/or higher engine load than the default threshold as the assigned confidence factor increases.

Another example method for a vehicle comprises: increasing an actual total number of available cylinder modes from a first actual total number of available cylinder modes to a second actual total number of available cylinder modes via a controller in response to audio and video feed captured inside the vehicle; and operating an engine via the controller in a cylinder deactivation mode after increasing the actual total number of available cylinder modes. In the preceding example, additionally or optionally, the increasing includes: assigning a confidence factor associated with a driver distracted state based on the audio and video feed; and selecting the second actual total number of available cylinder modes based on the assigned confidence factor, the second actual total number of available cylinder modes including a larger ratio of deactivated cylinders to active cylinders relative to the first actual total number of available cylinder modes. In any or all of preceding examples, additionally or optionally, the method further comprises extending an engine speed and load threshold at which cylinder deactivation is initiated beyond a default threshold as the assigned confidence factor increases. In any or all of preceding examples, additionally or optionally, a lower confidence factor is assigned when the driver distracted state is based only on the audio feed or only on the video feed, and wherein a higher confidence factor is assigned when the driver distracted state is based only each of the audio feed and the video feed. In any or all of preceding examples, additionally or optionally, the assigning includes: analyzing the audio feed for a volume setting of in-cabin speakers, operating state of a device communicatively coupled to a vehicle entertainment system, and driver voice recognition; and analyzing the video feed for driver eye movement, driver hand movement, and defined distracted gestures performed by a driver of the vehicle. In any or all of preceding examples, additionally or optionally, indicating a driver distracted state responsive to the audio feed includes one or more of a higher than threshold volume setting of the in-cabin speakers, actuation of the device communicatively coupled to the vehicle entertainment system, a higher than threshold frequency of driver speech, and a higher than threshold volume of driver speech; and wherein indicating the driver distracted state responsive to the video feed includes high frequency driver eye movement, high frequency driver hand movement, and identification of the defined distracted gestures being actively performed by the driver of the vehicle.

Another example vehicle system comprises: an engine having a plurality of selectively deactivatable engine cylinders; a vehicle cabin including speakers, a camera, and a microphone; a driver actuated button for transitioning the vehicle system between an autonomous mode and a driven mode upon actuation of the button; and a controller with computer-readable instructions stored on non-transitory memory that when executed cause the controller to: deactivate one or more of the selectively deactivatable engine cylinders responsive to engine operation in a first engine speed-load range when the button is not actuated, the first engine speed-load range adjusted as a function of audio feed and video feed captured at the vehicle; and deactivate one or more of the selectively deactivatable engine cylinders responsive to engine operation in a second engine speed-load range when the button is actuated, the second engine speed-load range including a higher engine speed and a higher engine load than the first engine speed-load range. In the preceding example, additionally or optionally, the controller includes further instructions for adjusting a number of the one or more cylinders deactivated in the first engine speed-load range as another function of the audio feed and video feed captured at the vehicle, wherein the number of the one or more cylinders deactivated in the second engine speed-load range is higher than the number of the one or more cylinders deactivated in the first engine speed-load range. In any or all of preceding examples, additionally or optionally, the controller includes further instructions for: capturing the audio feed via the speakers and the microphone, an upper engine speed and an upper engine load of the first engine speed-load range raised when the captured audio feed includes a higher than threshold setting of the speakers or an indication of driver speech; and capturing the video feed via the camera, the upper engine speed and the upper engine load of the first engine speed-load range raised when the captured video feed includes gestures indicative of driver distracted behavior. In any or all of preceding examples, additionally or optionally, the upper engine speed and upper engine load of the first engine speed-load range is raised by a smaller amount when one of audio feed and video feed is captured, and wherein the engine speed-load range is raised by a larger amount when each of audio feed and video feed is captured.

In a further representation, the vehicle system is a hybrid electric vehicle system.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A vehicle method, comprising:
   initiating a transition between operating an engine with a first actual total number of available cylinder modes to operating the engine with a second actual total number of available cylinder modes, the second actual total number of available cylinder modes based on a confidence factor associated with a driver distracted state, the confidence factor based on audio and video feed captured at a vehicle; and
   selecting an actual total number of available cylinder modes based on the confidence factor.

2. The method of claim 1, wherein initiating in response to the audio or video feed includes initiating in response to the audio and video feed being indicative of a vehicle driver being actively or passively in a distracted state.

3. The method of claim 2, further comprising capturing an audio feed of sound inside a vehicle cabin and analyzing the captured audio feed via voice recognition software to identify a voice of the vehicle driver.

4. The method of claim 3, wherein initiating the transition in response to the audio feed includes initiating the transition in response to the captured audio feed indicative of the vehicle driver engaged in in-cabin conversation.

5. The method of claim 1, further comprising capturing video feed of driver behavior inside a vehicle cabin and analyzing the captured video feed via image analysis software to identify a behavioral state of a vehicle driver.

6. The method of claim 2, wherein initiating the transition in response to the video feed includes initiating the transition in response to the captured video feed indicative of the vehicle driver being in the distracted state, the distracted state including driver eyes focusing on something other than a road of vehicle travel.

7. The method of claim 1, where audio feed includes audio feed from in-cabin speakers, and wherein initiating the transition in response to the audio feed includes initiating the transition in response to a volume setting of the in-cabin speakers being higher than a threshold based on vehicle speed.

8. The method of claim 1, where audio feed includes audio feed of ambient noise from an environment of the vehicle, and wherein initiating the transition in response to the audio feed includes initiating the transition in response to the ambient noise being higher than a threshold based on vehicle speed.

9. The method of claim 2, wherein the confidence factor is based on the audio or video feed, and wherein initiating in response to the audio and video feed includes:
   extending an engine speed-load threshold beyond a default threshold for cylinder deactivation as a function of the confidence factor.

10. The method of claim 9, wherein the extending includes initiating the transition between operating the engine with more active cylinders to operating with fewer active cylinders at a higher engine speed and/or higher engine load than the default threshold as the confidence factor increases.

11. A method for a vehicle, comprising:
    increasing an actual total number of available cylinder modes from a first actual total number of available cylinder modes to a second actual total number of available cylinder modes via a controller in response to audio and video feed captured inside the vehicle;
    operating an engine via the controller in a cylinder deactivation mode after increasing the actual total number of available cylinder modes;
    assigning a confidence factor associated with a driver distracted state based on the audio and video feed; and
    selecting the second actual total number of available cylinder modes based on the assigned confidence factor, the second actual total number of available cylinder modes including a larger ratio of deactivated cylinders to active cylinders relative to the first actual total number of available cylinder modes.

12. The method of claim 11, further comprising extending an engine speed and load threshold at which cylinder deactivation is initiated beyond a default threshold as the assigned confidence factor increases.

13. The method of claim 11, wherein a lower confidence factor is assigned when the driver distracted state is based only on the audio feed or only on the video feed, and wherein a higher confidence factor is assigned when the driver distracted state is based on each of the audio feed and the video feed.

14. The method of claim 11, wherein the assigning includes:
    analyzing the audio feed for a volume setting of in-cabin speakers, operating state of a device communicatively coupled to a vehicle entertainment system, and driver voice recognition; and analyzing the video feed for driver eye movement, driver hand movement, and defined distracted gestures performed by a driver of the vehicle.

15. The method of claim 14, wherein indicating the driver distracted state responsive to the audio feed includes one or more of a higher than threshold volume setting of the in-cabin speakers, actuation of the device communicatively coupled to the vehicle entertainment system, a higher than threshold frequency of driver speech, and a higher than threshold volume of driver speech; and wherein indicating the driver distracted state responsive to the video feed includes high frequency driver eye movement, high frequency driver hand movement, and identification of the defined distracted gestures being actively performed by the driver of the vehicle.

16. A vehicle system, comprising:
   an engine having a plurality of selectively deactivatable engine cylinders;
   a vehicle cabin including speakers, a camera, and a microphone;
   a driver actuated button for transitioning the vehicle system between an autonomous mode and a driven mode upon actuation of the button; and
   a controller with computer-readable instructions stored on non-transitory memory that when executed cause the controller to:
      deactivate one or more of the selectively deactivatable engine cylinders responsive to engine operation in a first engine speed-load range when the button is not actuated, the first engine speed-load range adjusted as a function of audio feed and video feed captured at the vehicle; and
      deactivate one or more of the selectively deactivatable engine cylinders responsive to engine operation in a second engine speed-load range when the button is actuated, the second engine speed-load range including a higher engine speed and a higher engine load than the first engine speed-load range.

17. The system of claim 16, wherein the controller includes further instructions for adjusting a number of the one or more of selectively deactivatable cylinders deactivated in the first engine speed-load range as another function of the audio feed and video feed captured at the vehicle, wherein the number of the one or more selectively deactivatable cylinders deactivated in the second engine speed-load range is higher than the number of the one or more selectively deactivatable cylinders deactivated in the first engine speed-load range.

18. The system of claim 16, wherein the controller includes further instructions for:
   capturing the audio feed via the speakers and the microphone, an upper engine speed and an upper engine load of the first engine speed-load range raised when the captured audio feed includes a higher than threshold setting of the speakers or an indication of driver speech; and
   capturing the video feed via the camera, the upper engine speed and the upper engine load of the first engine speed-load range raised when the captured video feed includes gestures indicative of driver distracted behavior.

19. The system of claim 16, wherein the upper engine speed and upper engine load of the first engine speed-load range is raised by a smaller amount when one of audio feed and video feed is captured, and wherein the engine speed-load range is raised by a larger amount when each of audio feed and video feed is captured.

* * * * *